United States Patent [19]

Creter, Jr. et al.

[11] Patent Number: 4,913,595

[45] Date of Patent: Apr. 3, 1990

[54] SHORELINE BREAKWATER

[75] Inventors: Frank E. Creter, Jr., Calverton, N.Y.; Richard E. Creter, Oldbridge Township, N.J.

[73] Assignee: Creter Vault Corporation, Flemington, N.J.

[21] Appl. No.: 120,486

[22] Filed: Nov. 13, 1987

[51] Int. Cl.$^4$ ................................................ E02B 3/06
[52] U.S. Cl. ...................................... 405/30; 405/25; 405/32
[58] Field of Search ............... 405/20, 25, 30, 31, 405/32, 33, 35, 284, 286

[56] References Cited

U.S. PATENT DOCUMENTS

| | | |
|---|---|---|
| 805,142 | 11/1905 | Kellner . |
| 1,175,962 | 3/1916 | Latham . |
| 1,816,095 | 7/1931 | Stanford ............................ 405/25 |
| 1,847,043 | 2/1932 | Ball . |
| 2,069,715 | 2/1937 | Arpin .............................. 405/25 |
| 2,967,398 | 1/1961 | Smith . |
| 3,037,726 | 6/1962 | Phillips . |
| 3,126,176 | 3/1964 | Lynn . |
| 3,653,216 | 4/1972 | Sticker, Jr. . |
| 3,733,831 | 5/1973 | Sticker, Jr. . |
| 3,797,787 | 3/1974 | Watanabe . |
| 3,845,630 | 11/1974 | Karnas . |
| 3,913,333 | 10/1975 | Hubbard, Jr. . |
| 4,397,578 | 8/1983 | Inman ............................... 405/33 |
| 4,407,608 | 10/1983 | Hubbard . |
| 4,436,447 | 3/1984 | Crowe ........................... 405/32 X |
| 4,471,924 | 9/1984 | Lynn . |
| 4,498,805 | 2/1985 | Weir . |
| 4,502,816 | 3/1985 | Creter, Jr. . |
| 4,524,551 | 6/1985 | Scheiwiller ................. 405/286 X |

FOREIGN PATENT DOCUMENTS 877057 11/1958 United Kingdom .

OTHER PUBLICATIONS

Engineering Record, "Sea Walls of Various Designs Discussed and Compared," vol. 73, No. 5, p. 140, 1-2-9-1916.

Primary Examiner—David H. Corbin
Attorney, Agent, or Firm—Kenyon & Kenyon

[57] ABSTRACT

A modular artificial reef effective to prevent shoreline erosion is constructed of base modules placed in side-by-side contact adjacent the shoreline and locked together by superposed reef-forming modules, preferably having a triangular prismatic shape presenting a gently sloping face to the sea, which contact is at least two base modules and are in side-by-side contact with each other.

16 Claims, 3 Drawing Sheets

SHORELINE BREAKWATER

The present invention is directed to a breakwater structure which can be produced from transportable concrete modules, assembled and locked in place adjacent an eroding shoreline to protect the shoreline from further erosion by capture and buildup of sand without harm to adjacent shore properties.

BACKGROUND OF THE INVENTION AND THE PRIOR ART

In our prior U.S. Pat. No. 4,502,816, we described the production of a shoreline breakwater produced from reinforced concrete prismatic modules having a gently sloping seaward face which were assemblable in side-by-side relation on the sea bottom to form an artificial reef. Tests over a three year period on the North Shore of Long Island in a location where shoreline erosion has caused severe property damage in recent years have demonstrated the patented device is indeed effective in preventing continued erosion and serves to capture sand in great quantities so as to build the beach without robbing sand from adjacent properties and thereby causing harm. It was found that individual modules comprising the breakwater moved in relation to adjoining modules resulting in an uneven contour to the overall reef, thereby creating esthetic concerns. It was accordingly deemed desirable to improve the stability of the artificial reef in contact with the powerful destructive forces of the sea so as to improve the esthetic appearance of the reef over time and also to improve the performance of the reef in capturing sand and protecting the shoreline. It is to these objectives that the present invention is directed.

BRIEF DESCRIPTION OF THE INVENTION

In accordance with the invention, an artificial reef is produced adjacent a shoreline by assembling in edge-to-edge relation a plurality of concrete base units each of which has a rectangular section in plan view and locking the base units together by superposing thereon a plurality of concrete reef-forming modules, likewise rectangular in plan view and configured to form a series of interlocks with the base unit modules. The interlocks may be formed as mortise-and-tenon joints. Each module is provided with smooth parallel sides permitting close side-by-side placement so as to prevent formation of channels which would afford entry by the sea.

DETAILED DESCRIPTION OF THE INVENTION

Figure 1:
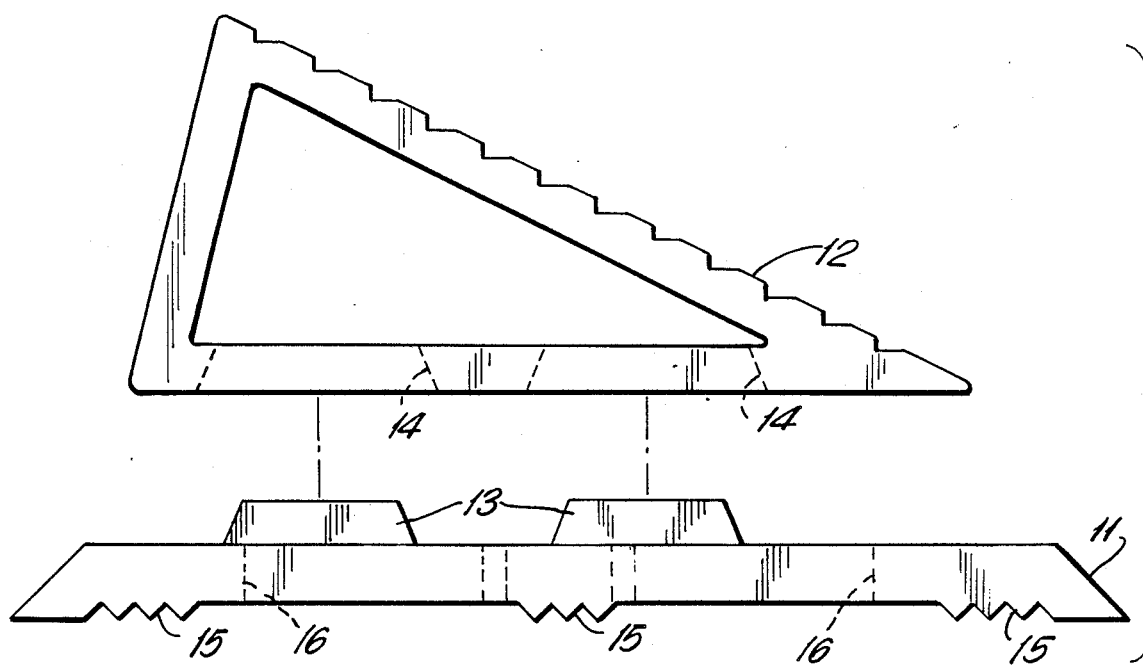
FIG. 1 depicts in elevation the base unit module provided by the invention and shows in elevation a preferred reef-forming module employed in accordance with the invention.
Figure 2:
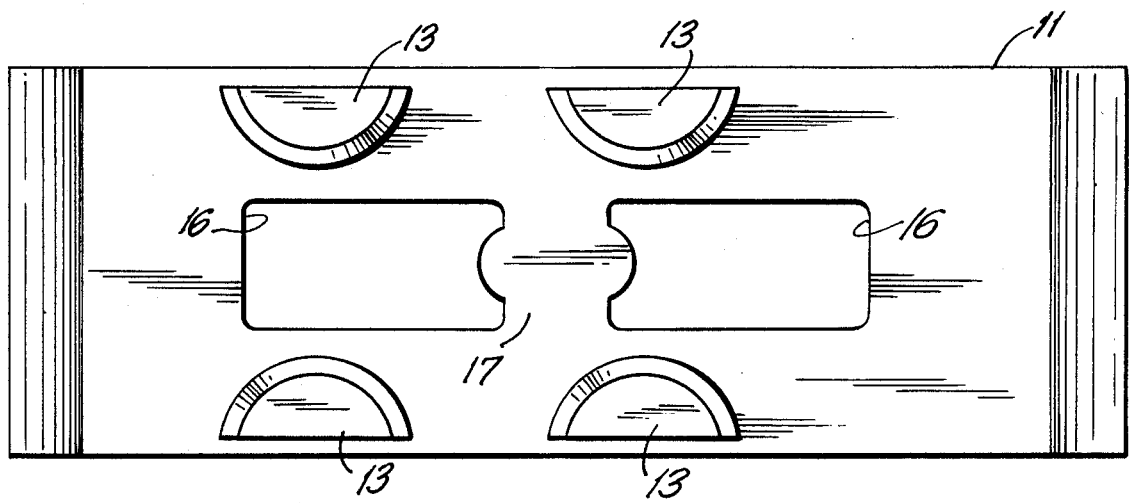
FIG. 2 depicts in plan view the base module contemplated in accordance with the invention.

The invention will now be described in conjunction with the drawings wherein FIGS. 1 and 2 depict with reference character 11 the elevation and plan views, respectively of the concrete base unit contemplated in accordance with the invention. Reference character 12 in FIG. 1 depicts in elevation a preferred reef-forming module employed in accordance with the invention. Base unit 11 is shown with tenon segments 13 which engage mortises 14 in the longitudinal center line of module 12. Base unit 11, which is designed to rest on the sea bottom in the surf zone preferably is equipped with sand gripping feet 15 which, as illustrated preferably have a sawtooth configuration in contact with the bottom and extended across the width of the module. As shown in FIG. 2, tenon segments 13 are located toward the edges of base unit 11 and are designed such that when base units 11 are placed side by side on the bottom, tenon segments 13 on adjoining base units are locked together with a single mortise 14 in module 12 when module 12 is lowered upon two adjoining base units such that module 12, which Preferably has the same width as base unit 11 is lowered with half its width resting on each of two base units. This is illustrated in perspective in FIG. 3 which shows a single module 12 resting upon two base units 11. The mortise 14 in module 12 effectively locks tenon segments 13 on base units 11 together. Construction of the artificial reef can thus be carried out to the desired length by laying down further base units 11 and locking the tenon segments thereof with further reef-forming modules 12 laid side-by-side to the module shown.

Figure 3:
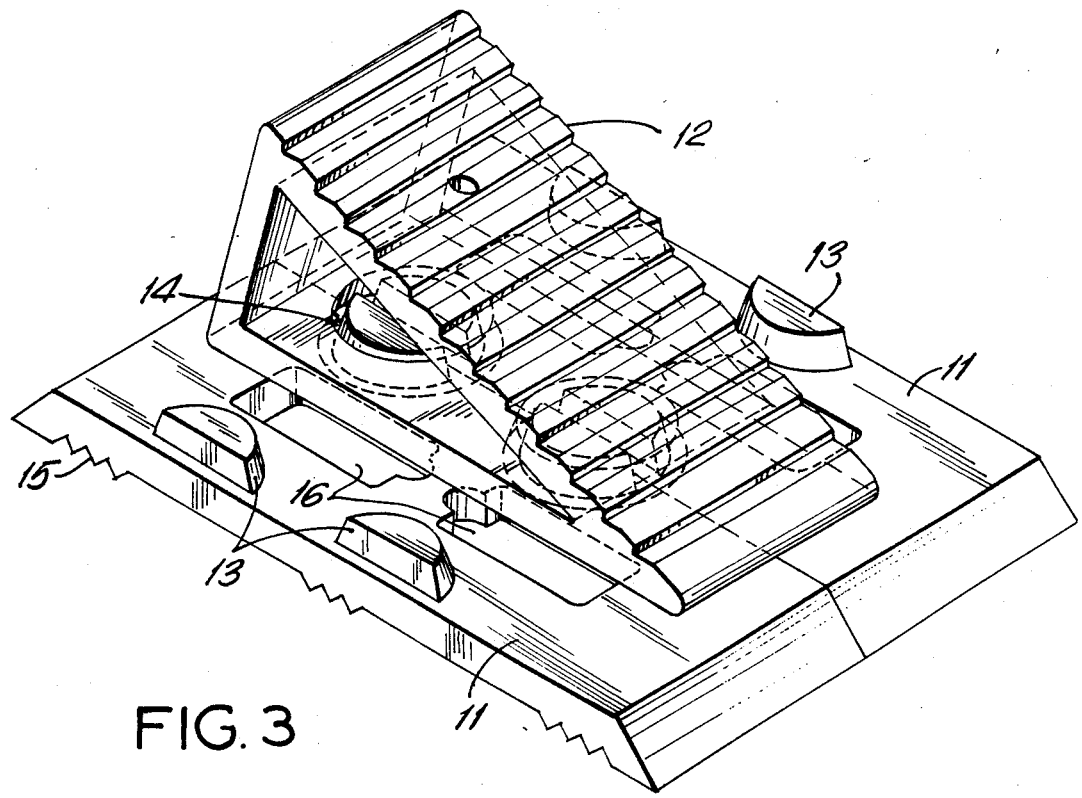
FIG. 3 depicts in perspective the manner in which a superposed reef-forming module relates to and locks together a pair of base modules.

Referring again to FIG. 2, base unit 11 may be cored out as shown at 16 to leave web 17. This provides a weight saving and a means for carrying the base unit with slings. As shown in FIGS. 1 and 3 the front and rear edges of base unit 11 are sloped upwardly and inwardly at an angle which may be approximately 45°.

A shelf may be provided on top of base unit 11 defined by the front and rear ends of module 12 and the upper face boundary of the assembled base units 11.

The ends of the completed artificial reef may if desired be finished with special end pieces 18 covering the projecting halves of the end base units 11 and presenting gently sloping seaward and end faces.

The preferred reef-forming module is that shown as reference character 12 in perspective in FIG. 3 as a triangular reinforced concrete module, and is described in detail in our U.S. Pat. No. 4,502,816 which is incorporated herein by reference. Briefly, the module described in the said patent has an acute included angle between the foot or bottom face and the gently sloping seaward face of preferably about 28°. The slope between the seaward face and the foot may be between about 1:4 and about 3:4. The rearward or beachward face of the module forms an angle less than 90° with the bottom face. Advantageously, the seaward face of the module is provided with wave force dissipation means which serve to dissipate wave energy as the waves run up the seaward face without creating secondary reflected forms of wave energy. Such force dissipation means also serve to release silt or sand suspended in the water such that it will slide down the seaward face and add to the solid material around the toe of the structure. A form of wave force dissipation means on the seaward face is illustrated in FIG. 3 as a set of parallel transverse grooves extending across the seaward face. A washboard configuration or a system of small surface protrusions or bumps are also useful. Mortises 14 are provided to lock over tenon segments 13 in adjacent base modules placed side-by-side thereunder. The base of the module should be at least twice as long as the height of the module in order to contribute stability against wave pounding on the seaward face; so as thereby to provide a low center of gravity.

The composite, locked-together artificial reef may be placed in shallow water at low tide in tidal waters and may be overtopped by wave action at high tide. It may be submerged completely by storm tides.

Figure 4:
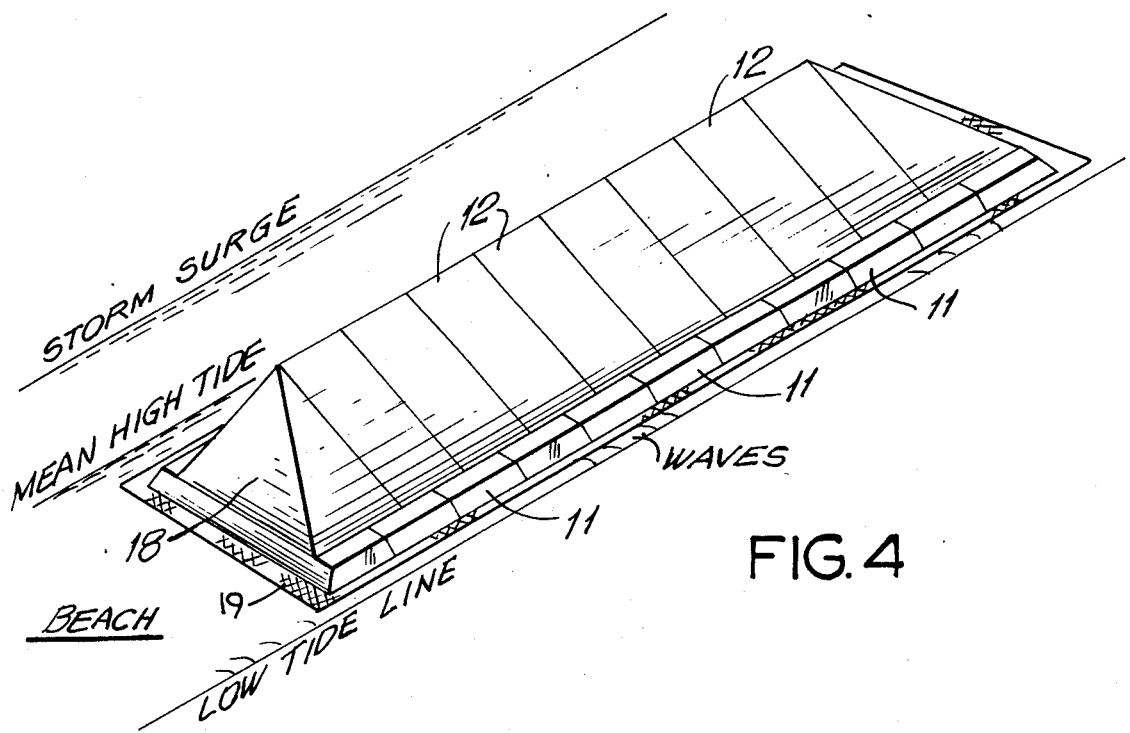
FIG. 4 depicts a completed reef assembled at the low-tide line in tidal waters.

An artificial reef 140 feet long was constructed on a leveled section of tidal beach at the low tide mark by placing side-by-side on filter fabric a series of 35 base modules having the configuration shown in FIGS. 1 and 2. The modules were four feet wide, 11 ½ feet long and about 9 inches thick. The long sides were straight and the top platform was 9 ½ feet long. The seaward and beachward ends were sloped inwardly and upwardly at an angle of 33°. Upwardly facing tenon segments of semi-circular section were molded into the module at the edges, so as to form circular tenons with the adjoining module. The base modules weighed about 4200 pounds apiece. Reef forming modules 12 having the same width as the base modules, i.e., four feet wide, four feet high and 9 feet long on the foot and the configuration shown in FIG. 3 having cast mortises designed to lock together the mating tenon segments on the base units were placed thereon and offset by one-half the width with respect to the base units. A series of 34 reef-forming modules, each weighing about 4200 pounds was placed side-by-side upon the aligned base modules to lock together the base modules and present a practically continuous seaward face. The projecting halves of the base units at each end of the reef were covered with end pieces having forwardly and rearwardly sloped faces parallel to those of modules 12 and having sloped endward faces as shown by reference character 18 in FIG. 4. It was observed that, after only two tides, a substantial accumulation of sand and small stones had been captured at the front foot of the structure, thereby showing that the rate of solid-deposition substantially exceeded any tendency to toe scour.

The individual units comprising the composite structure may be placed offshore or along the shoreline by helicopter or may be carried on a flat-bed truck if the beach is accessible. Larger modules may be employed if desired but the handling problems are thereby accentuated and internal bracing might then be needed.

It is preferred that the modules be prepared using micro silica concrete having a compressive strength of 8000 psi. Long life for the reinforced concrete modules is thereby assured even in salt water.

The outer modules can be connected by reinforced concrete beams or the like to assist in stabilizing the outer modules. Preferably, the modular structures are assembled on filter fabric 19 placed on the beach thereunder. Filter fabric is a porous material made of synthetic fiber which is industrially available.

It will of course be appreciated that, no matter how the artificial reef is oriented with respect to the shoreline, waves will strike the face thereof at an angle. Wave forces applied to the reef will be non-uniform and of varying intensity. The reef must nevertheless perform its desired function of accumulating sand and protecting the shoreline. It will also be noted that the present artificial reef design avoids vertical surfaces which tend to promote "toe scour", a powerful wave action which can cause toppling of structures having vertical surfaces.

While the base unit has been described in terms of having upwardly extending tenon segments and having mortises cast in the base of the cooperating reef forming units, it is to be appreciated that the respective units can be produced with downwardly extending concrete tenon segments at the edges thereof and mortises can be cast in the base units so as to receive the adjacent tenon segments when placed thereover, such as illustrated in a FIG. The tenon segments should be sturdy.

Ample draft should be provided to assist in stripping the cast elements from the mold. In addition, all openings should be provided with ample draft so that ice may pass therethrough during freeze-thaw conditions.

A feature of the artificial reef described herein is that the rate of sand capture therefor is greatest during storm periods when strong wave action churns up the sea bottom and the load of suspended solids in the surf zone is greatly increased as compared to that existing during calm water periods. The protection to the beach and inland bluff is thus substantially independent of solids captured from the littoral drift. In this manner damage to adjacent properties due to interference with the littoral drift, as can happen with groins and the like, is avoided.

Although the present invention has been described in conjunction with preferred embodiments, it is to be understood that modifications and variations may be resorted to without departing from the spirit and scope of the invention, as those skilled in the art will readily understand. Such modifications and variations are considered to be within the spirit and scope of the invention and appended claims.

What is claimed is:

1. A shoreline breakwater comprising in combination
   a plurality of substantially flat concrete base members, each including a front face, a rear face, parallel sides, an upper surface, and locking means on said upper surface, and
   a plurality of concrete modular units having a substantially triangular shape when viewed in side elevation, each having parallel sides, a gently sloping seaward surface, a bottom surface, and locking means on said bottom surface,
   wherein a modular unit is placed atop two adjacent base members and said locking means of said modular unit engages said locking means on each of the two adjacent base units on which it is placed to connect said adjacent base members.

2. The shoreline breakwater according to claim 1, wherein said locking means on said upper surface of said base members comprises at least one upwardly extending tenon means.

3. The shoreline breakwater according to claim 2, wherein said locking means on said bottom surface of said modular unit comprises at least one mortise.

4. The shoreline breakwater according to claim 3, wherein said tenon means are arranged on said upper surface of said base units near said parallel sides.

5. The shoreline breakwater according to claim 4, wherein a mortise on said bottom surface of said modular units engages at least one tenon means from each of the adjacent base units on which it is placed.

6. The shoreline breakwater according to claim 1, wherein said base members and said modular units each have substantially the same width.

7. The shoreline breakwater according to any of claim 1 through 6, wherein each of said base members is provided with downwardly projecting feet adapted to grip a sand bottom.

8. The shoreline breakwater according to claim 7, wherein said feet have a saw tooth configuration.

9. The shoreline breakwater according to any of claims 1 through 6, wherein each of said mortises and tenon means is provided with substantial draft, whereby locking is assisted.

10. The shoreline breakwater according to claim 1, wherein each of said seaward faces is provided with wave force dissipation means.

11. The shoreline breakwater according to claim 10, wherein said wave force dissipation means comprises a plurality of parallel, transverse grooves.

12. The shoreline breakwater according to claim 1, wherein said base units are placed upon a filter fabric.

13. The shoreline breakwater according to claim 1, wherein said locking means on said upper surface of said base members comprises at least one mortise, and wherein said locking means on said bottom surface of said modular unit comprises at least one downwardly extending tenon means.

14. A method for protecting a shoreline against erosion comprising the steps of placing a single course of substantially flat rectangular concrete base members in side-by-side relation, each base member having a front surface, a rear surface, parallel sides and an upper surface having locking means thereon, wherein a parallel side of a base member is adjacent the parallel side of its adjacent base member, placing a single course of concrete modular units on said single course of base members, said modular units each having a substantially triangular shape when viewed in side elevation and having a bottom surface with locking means thereon, parallel sides, and a gently shaping seaward face between said parallel sides, wherein said single course of modular units is offset relative to said single course of said base members so that each modular unit rests on two adjacent base members and the locking means of said modular unit interlocks with the locking means of the two base members on which said modular unit is placed.

15. The method according to claim 14, wherein said single course of base member is placed on a filter fabric.

16. The method according to claim 14, wherein said seaward face is provided with a wave energy dissipating pattern.

* * * * *

UNITED STATES PATENT AND TRADEMARK OFFICE
CERTIFICATE OF CORRECTION

PATENT NO. : 4,913,595

DATED : April 3, 1990

INVENTOR(S) : Creter, Jr. et al.

It is certified that error appears in the above-identified patent and that said Letters Patent is hereby corrected as shown below:

Column 2, line 10, change: "illustrated preferably" to --illustrated, preferably--.

Column 2, line 19, change: "Preferably" to --preferably--.

Column 2, line 20, change: "11 is" to --11, is--.

Column 2, line 53, change: "angle less" to --angle of less--.

Column 3, line 56, change: "fabric is" to --fabric 19 is--.

Column 4, line 8, change: "in a" to --in--.

Figure 5:
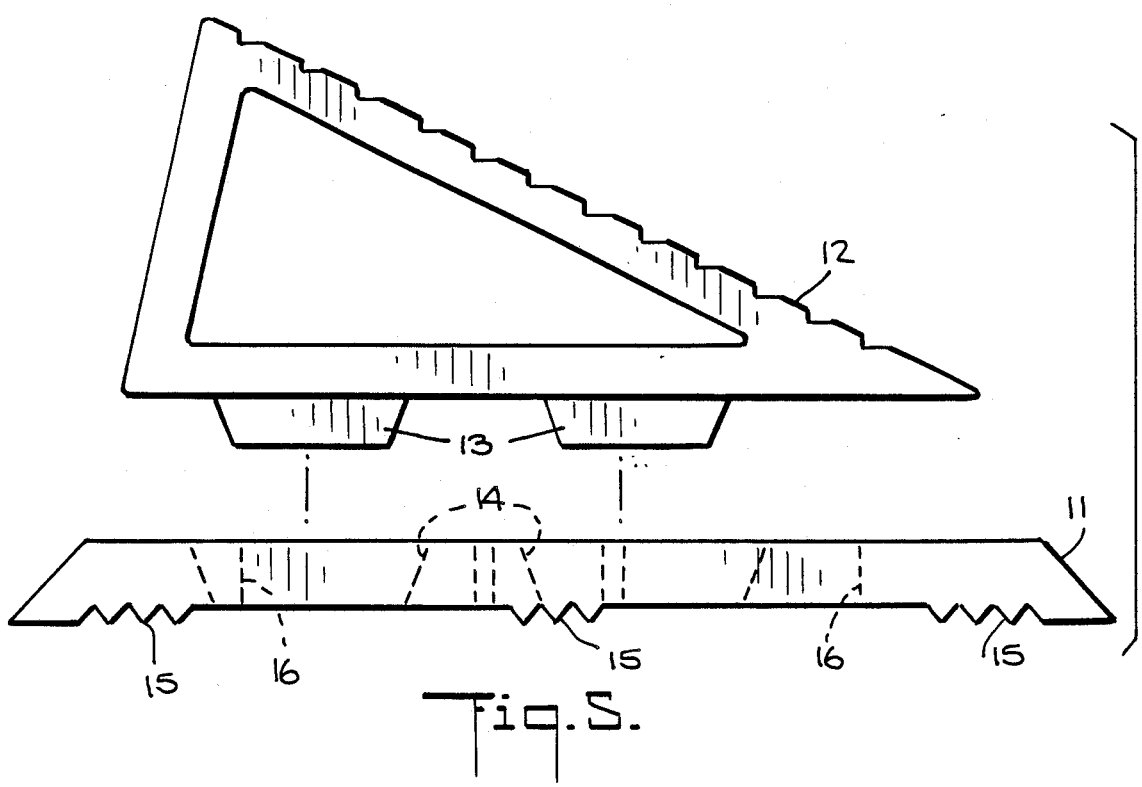

Column 4, line 9, change: "Fig. The" to --Fig. 5. The--.

Column 5, line 4, change: "saw tooth" to --sawtooth--.

Column 6, line 13, change: "gently shaping" to --gently sloping--.

Column 6, line 22, change: "member" to --members--.

Signed and Sealed this

Seventh Day of May, 1991

Attest:

HARRY F. MANBECK, JR.

*Attesting Officer*  *Commissioner of Patents and Trademarks*